United States Patent [19]

Yeo et al.

[11] 4,313,260
[45] Feb. 2, 1982

[54] ASSEMBLY MACHINE

[75] Inventors: Norman H. Yeo, Georgetown, Mass.; Douglas Swanson, McKean, Pa.

[73] Assignee: Swanson-Erie Corporation, Erie, Pa.

[21] Appl. No.: 26,023

[22] Filed: Apr. 2, 1979

[51] Int. Cl.³ .............................................. B23P 19/04
[52] U.S. Cl. ....................................... 29/792; 29/785; 29/33 J; 29/38 A; 29/35.5; 29/430
[58] Field of Search ................ 29/792, 785, 430, 33 J, 29/564.1, 38 A, 38 B, 38 C, 35.5, 36

[56] References Cited

U.S. PATENT DOCUMENTS

| 1,273,878 | 7/1918 | Lacroix | 29/792 |
|---|---|---|---|
| 2,324,523 | 7/1943 | Lund | 29/785 |
| 2,842,985 | 7/1958 | Grover | 29/38 C |
| 2,962,846 | 12/1960 | Marindin | 29/33 |
| 3,065,530 | 11/1962 | Merchant et al. | 29/428 |
| 3,143,792 | 8/1964 | Swanson et al. | 29/564 |
| 3,231,968 | 2/1966 | Swanson | 29/113 |
| 3,341,927 | 9/1967 | Grainger | 29/38 C |
| 3,359,619 | 12/1967 | Walkden | 29/785 |
| 3,544,754 | 12/1970 | Buttke | 29/430 |
| 3,551,993 | 1/1971 | Cassai et al. | 29/785 |
| 3,740,806 | 6/1973 | Witzig et al. | 29/38 C |
| 3,851,384 | 12/1974 | Kellner et al. | 29/430 |
| 3,895,424 | 7/1975 | Hautau | 29/38 C |
| 3,897,620 | 8/1975 | Wright | 29/430 |
| 3,939,544 | 2/1976 | Stevens | 29/33 R |
| 4,007,521 | 2/1977 | Keusch | 29/38 C |
| 4,184,236 | 1/1980 | Nutt | 29/792 |

Primary Examiner—Daniel C. Crane
Attorney, Agent, or Firm—Hume, Clement, Brinks, Willian & Olds, Ltd.

[57] ABSTRACT

An assembly machine which has a plurality of work stations for performing operations on articles is disclosed. The machines includes means for conveying articles between work stations, a tool plate adapted to support tooling to perform operations at a plurality of work stations, and means for reciprocating the tool plate in synchronism with the movement of the conveying means wherein the reciprocating means are mechanically independent from the conveying means.

20 Claims, 4 Drawing Figures

ASSEMBLY MACHINE

BACKGROUND OF THE INVENTION

This invention relates to assembly machines and, more particularly, to automated machines adapted to assemble articles of manufacture made up of a plurality of parts.

Assembly machines of the type disclosed have been found suitable to assemble articles made up of several relatively small parts. Vibratory hoppers typically feed article parts to a movable turret. Some of the most successful units are those which incorporate a rotary turret including a plurality of spaced fixtures or nests adapted to receive the article parts from the hopper. As each article part is received, the turret is intermittently rotated or indexed, thus presenting an empty nest to the feed hopper at predetermined timed intervals. The indexing turret is ordinarily in a horizontal plane but the machine could also be designed to operate at any other angle through the provision of suitable nests.

Assembly machines with rotary indexing turrets typically include at least one reciprocable plate mounted above the turret, substantially parallel thereto. The plates are mounted to a central movable shaft, which is either designed to reciprocate as in U.S. Pat. No. 3,143,792 or to rotate as in U.S. Pat. Nos. 3,065,530 and 3,939,544. The rotary shafts include cylindrical cams which translate rotation into reciprocation, as shown in the above patents.

In a typical operation an article part is fed by a hopper to the assembly turret where it is received at a nest. The turret is then indexed to a work station where any number of operations may be performed. For example, a second hopper may be utilized to provide a second part which can be secured to the article part at the work station. Alternatively or additionally the article part can be drilled, tapped, relocated, stamped or removed from the turret. Any number of other conventional operations can also be performed. In certain applications it may be desirable to include a probe at the second station to insure that the article part has been properly positioned on the nest.

The plates, which are often referred to as tool plates, are designed to support tooling which may take the form of tools, tool activators, or the like. When a machine is provided with two tool plates, tools may be mounted to one plate, with means for actuating the tools mounted to the second plate. Thus, as the tool plates reciprocate with respect to the turret, operations are performed on the article parts.

Regardless of the exact configuration of the tool plates and their tooling, it is imperative that the indexing of the turret be synchronized with the reciprocation of the tool plates. Otherwise, the turret might be indexing while operations are being performed at a work station, thereby resulting in jamming or damage to the article parts and/or the tooling. Synchronization has conventionally been implemented by powering the turret and the tool plates off of the same drive shaft as taught in U.S. Pat. Nos. 3,065,530 and 3,939,544. By mechanically interlocking the indexing and operation components of the machine in this manner, full synchronization is assured. At the same time, a relatively simple drive mechanism is made possible.

While the above-described designs have been generally acceptable, the mechanical interlock between the indexing and operation portions of the machines does give rise to certain limitations. For example, in a machine with a rotary tool plate drive shaft, the shaft must be continuously rotating when intermittent indexing is taking place.

In many automated assembly operations it has been found that dwells must be provided at certain portions of the cycle of reciprocation of the tool plates. For example, to insure that the tooling is in a retracted position while the turret is indexing, it may be desirable to provide a dwell period while the tool plates are in their uppermost position. An example of this type of cycle is shown and explained in U.S. Pat. No. 3,065,530. A dwell period is also ordinarily necessary during the time in which an article part is moving from the feed hopper to the escapement. The term "escapement" as used herein is intended to define means for gripping the article parts when they are being transferred from the hopper to the turret nest. This dwell is also shown in the aforementioned patent. Conventional "pick-up and place" operations performed on assembly machines such as those described in U.S. Pat. Nos. 3,231,968 and 3,939,544 also ordinarily require a tool plate dwell period while the article parts are transferred from the hopper to the pick-up device.

As mentioned above, each tool plate is typically driven by a cylindrical cam mounted to the tool plate drive shaft. The tool plate dwells discussed above are provided by horizontal portions in the cam. Thus, with the tool plate drive shaft and the cam making one rotation for each machine cycle, the tool plate reciprocation of each cycle must be concentrated into the remaining portion of the cam. For example, if the dwell period must comprise ¼ or 90° of a cycle, the reciprocation must be provided within the remaining 270°. The resulting steep cam contours can cause excessive friction and bring about loading difficulties unless severe weight limits are put on the components mounted to the tool plates.

A similar situation pertains to the conventional turret drive train. The turret is typically driven by a cross over cam which acts on a follower mounted to the underside of the turret as shown and described in U.S. Pat. No. 3,143,792. In order to provide an intermittent indexing motion, the cross over cam must include flat portions along much of its surface. The portion of the cam which actually indexes the turret must therefore have a relatively steep contour, thus causing high friction and loading difficulties discussed above with respect to the tool plates.

A primary object of the present invention is to overcome the above difficulties while providing a machine which is relatively simple in construction.

SUMMARY OF THE INVENTION

The present invention achieves the desired results and at the same time eliminates the need for some of the cumbersome mechanisms seen in the prior art. An assembly machine is provided which includes means for driving the tool plate which are independent from the means for conveying articles between work stations. Alternatively, the invention may be described as providing means for intermittently driving the tool plate.

In one embodiment, the invention includes means for conveying articles between work stations, a tool plate adapted to support a plurality of tools to perform operations at a plurality of work stations, and means for reciprocating the tool plate in synchronism with the movement of the conveying means wherein the reciprocating means are mechanically independent from the conveying means.

The means for conveying articles between work stations may comprise a turret having a surface disposed in a plane, the turret being rotatable about an axis. The machine may also include a movable shaft coaxially aligned with the turret axis, with a plate mounted thereto adapted to move therewith, such plate being disposed in a plane substantially parallel to the turret plane and being movable relative to the turret. Means for intermittently driving the shaft in a synchronism with the indexing of the turret would also be included, thereby intermittently moving the plate relative to the turret.

The novel features which are believed to be characteristic of the invention are set forth in the appended claims. It is believed the invention will be best understood by reference to the following description taken in connection with the accompanying drawings in which:

DETAILED DESCRIPTION OF THE PREFERRED EMBODIMENTS

Figure 1:
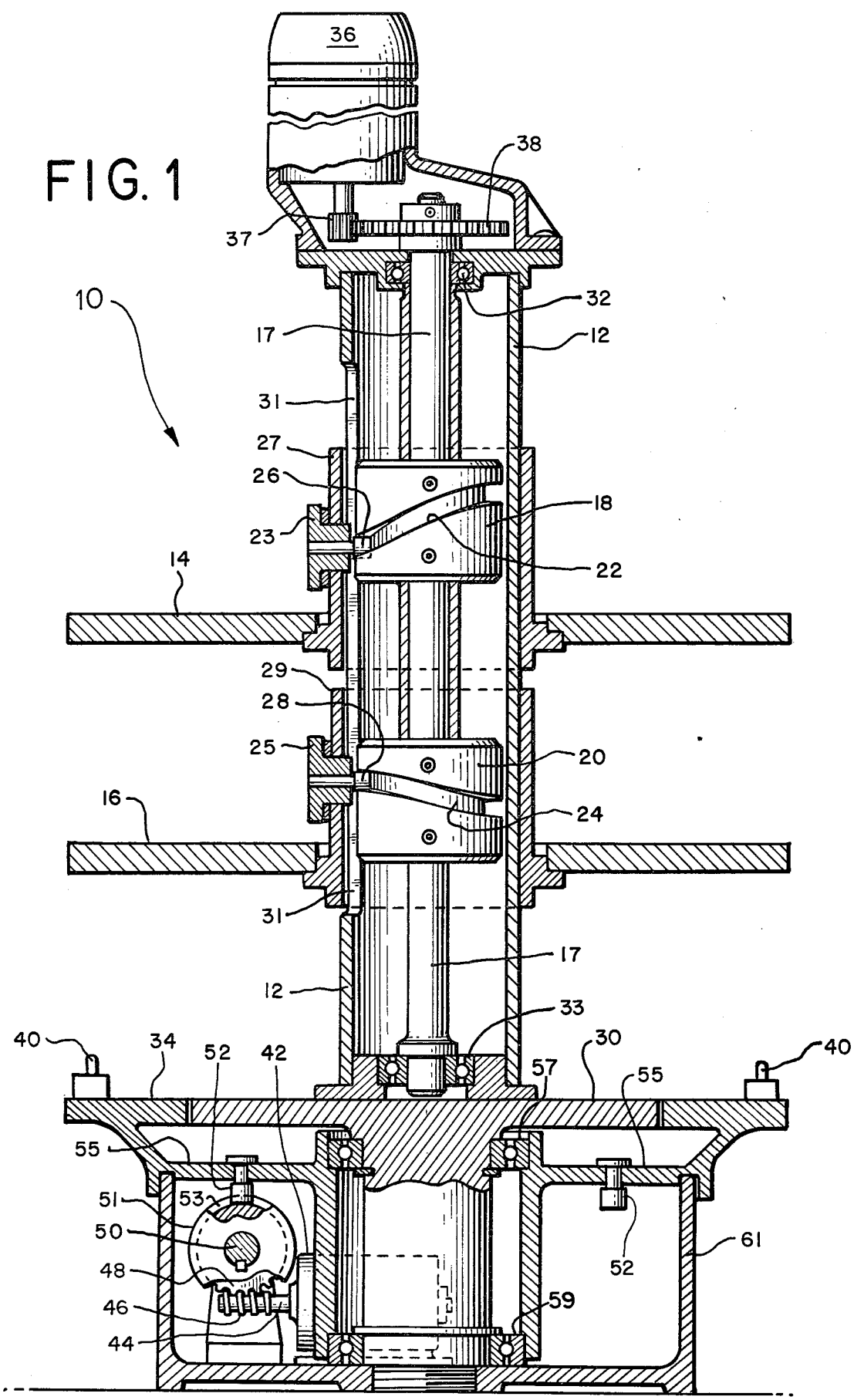
FIG. 1 is an embodiment of a rotary assembly machine incorporating the present invention.

Referring now to FIG. 1, there is shown an assembly machine identified by reference numeral 10. The depicted machine is simplified, with only the pertinent features shown. The machine includes a central column 12 with two reciprocable tool plates 14 and 16 concentrically mounted thereto. The tool plates are driven by a rotating central shaft 17 via cylindrical cams 18 and 20. Briefly, each cam defines a groove 22 or 24 in its periphery. Cam followers 26 and 28 are rotatably journalled in follower mounts 23 or 25, and are positioned within the cam grooves. The follower mounts 23 and 25 are fixed to tool plate support sleeves 27 or 29, and extend inwardly from these sleeves through a longitudinal slot 31 in the central column 12, thereby preventing the mounts and their followers from rotating with the cylindrical cams 18 and 20. The tool plate support sleeves 27 and 29 are, in turn, fixed to tool plates 14 or 16. Thus, the rotation of the central shaft 17 will result in reciprocation of tool plates 14 and 16 as the followers glide up and down in the cam grooves.

The tool plate drive shaft 17 is rotatably mounted to the central frame 30 in bearings 32 and 33. In the depicted embodiment the tool plate drive shaft is powered by a motor 36 mounted to the top of the assembly machine 10, with reduction gears 37 and 38 to bring the drive speed down to an appropriate level.

In one preferred embodiment of the invention the tool plate drive shaft 17 is provided with means to be intermittently rotated. Such means may comprise a brake motor with high start up torque and the capability to engage and disengage at a high frequency. Alternatively, a clutch coupling (not shown) mounted between the drive motor 36 and the drive shaft 17 may be utilized. The use of such a coupling would necessitate inclusion of separate braking means.

The provision of an intermittently rotatable shaft allows the machine to be designed so that the shaft will stop rotating when the tool plates are to be stationary. Thus, the dwell or horizontal portions of conventional tool plate drive cams can be eliminated, and the reciprocation actuation portions of the cam surfaces can be spread over as much as 360°. This enables the cam groove contours to be cut at lower angles, thereby reducing friction and allowing greater tool plate loading.

The rotary turret 34 is designed to move intermittently, thereby presenting articles in various stages of assembly to the work stations positioned around the machine. The turret 34 includes nests 40 which are adapted to receive article parts from the feed hopper (not shown). The turret 34 is driven by a second motor 42 and its drive shaft 44. A worm 46 is included on the shaft 44 with a complementing worm gear 48. The worm gear 48 is mounted to and drives an intermediate shaft 50. A cross over cam 51 is also mounted to the intermediate shaft 50. This cam 51 includes a peripheral spiral groove 53 which is adapted to receive indexing rollers 52. These rollers 52 are rotatably mounted to the turret body 55. These rollers 52 are evenly spaced around the underside of the turret body. The turret body 55 is rotatably mounted to the central frame 30 by bearings 57 and 59 so that it is rotatable with respect to said frame and the machine housing 61.

In one embodiment of the invention the turret drive train is provided with a brake motor having high start up torque and a high frequency engage and disengage capability. Alternatively, a clutch coupling and brake combination (not shown) may be utilized. Either design gives the operator the capability to intermittently rotate the corss over cam. Such a capability provides the same advantages discussed above with respect to the tool plate drive shaft, i.e., increased flexibility and smaller angle gear cuts. Thus, either the turret drive or the tool plate drive or both may be intermittently driven.

Figure 2:
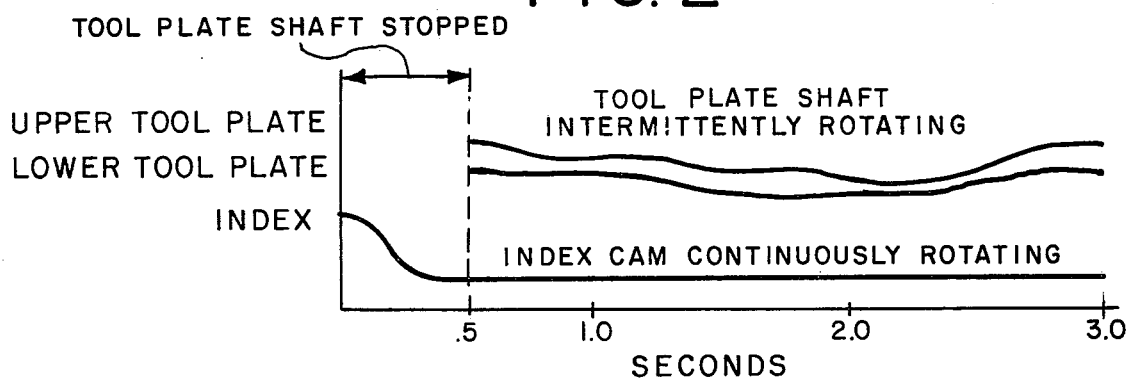
FIG. 2 is a timing diagram showing one typical timing sequence of the type of machine shown in FIG. 1.
Figure 3:
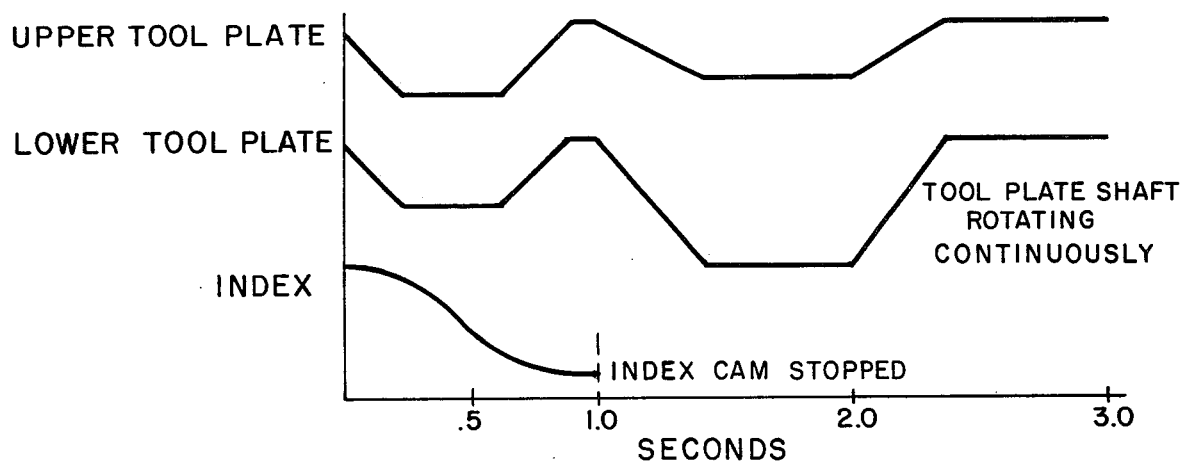
FIG. 3 is a timing diagram showing another typical timing sequence of the type of machine shown in FIG. 1.
Figure 4:
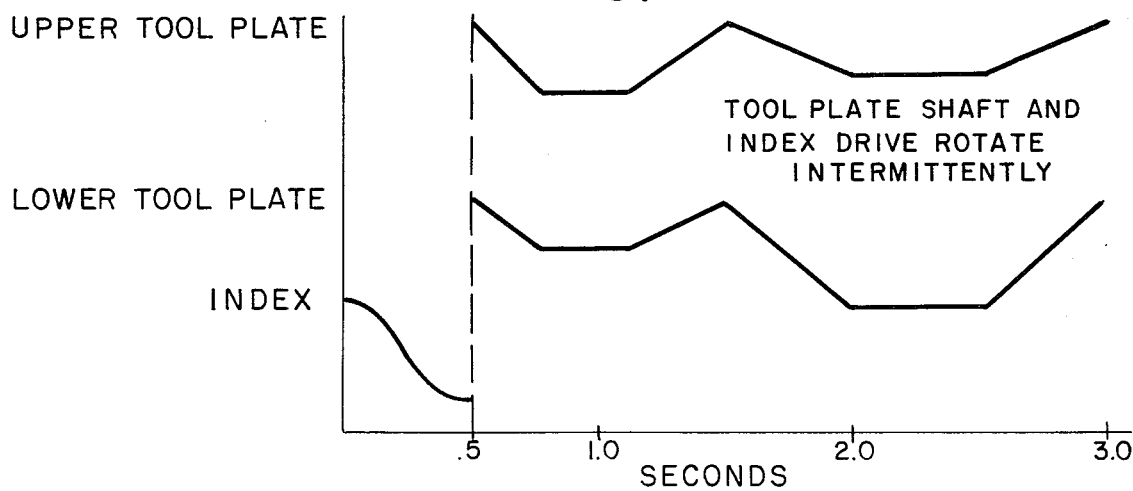
FIG. 4 is a timing diagram showing a third typical timing sequence of the type of machine shown in FIG. 1.

FIGS. 2, 3 and 4 illustrate typical cycles which may be provided, although the versatility of this invention enables a wide range of other possibilities. FIG. 2 depicts a double tool plate cycle in which the tool plate drive shaft is rotated intermittently while the turret drive rotates continuously. This cycle is designed to take parts from a feed hopper and insert them into turret nests. The cycle is similar to that described in U.S. Pat. No. 3,065,530, but is distinguishable in that during the indexing of the turret, the tool plate drive shaft is stationary. This allows reciprocation of the tool plates to be provided during 360° of shaft rotation rather than only 270° as in the aforementioned patent.

FIG. 3 depicts a double tool plate pick-up and place operation which is similar to the single tool plate operation described and shown in U.S. Pat. No. 3,231,968. However, FIG. 3 shows the cross over cam as being intermittently driven while the tool plate drive shaft is continuously rotated. Thus, the flat dwell portions need only be provided in the tool plate drive cams and not in the cross over cam.

FIG. 4 also illustrates a double tool plate pick-up and place operation, but shows both the tool plate drive shaft and the cross over cam as being intermittently driven. Thus, neither the tool plate drive cams nor the cross over cam require flat dwell portions.

As discussed above, the use of independently powered tool plate and turret drives provides a versatility never before achieved. Controls can be built into the system which allow the cycles to be modified depending upon the operations to be performed. In the past, mechanical synchronization of the two drives made this impossible. In the cycles depicted in FIGS. 2 and 3 the tool plate drive shaft or the cross over cam will be intermittently powered. Thus, electrical switches should be built into the system to energize and deenergize the motors at the required times. As mentioned above, a self braking capability is preferably provided to insure that the drives are immediately stopped upon deenergization. In the cycle depicted in FIG. 4, only one of the drives will be powered at any given time. Therefore, a flip-flop switch (not shown) can be utilized, sending current to one and then the other portion of the machine. For the purposes of illustration, the operation of this cycle will be discussed in detail. It will be assumed that the machine includes radially reciprocable feed means such as shown in U.S. Pat. No. 3,231,968 to transfer piece parts from the hopper to a position directly below the tool plate pickup head. The drive for such means is well known in the art so will not be discussed.

The cycle begins with energization of the indexing drive motor, thereby rotating the cross over cam 51 a predetermined amount, which may be as much as 360°. The follower 52 engaged by the cross over cam causes the turret 34 to index, thereby bringing a turret nest 40 into position at a work station below a tool head. At the same time, the feed means can be transferring a piece part from the hopper to a position directly below the pickup head. Since the tool plate drive shaft 17 is stationary in its deenergized mode, the tool plates 14 and 16 will not reciprocate.

When the turret 34 is fully indexed and the article part is in place below the pickup head, the flip-flop switch deenergizes the turret drive motor 42. The self braking capability of this motor causes the turret to be immediately stopped. Locking means (not shown) such as described in U.S. Pat. No. 3,143,792, may be included to lock the turret in position once the indexing operation is completed.

Energization of the tool plate drive shaft motor 36 causes the drive shaft 17 and cylindrical cams 18 and 20 to rotate. The cam followers 26 and 28 cooperate with their mounts 23 and 25 to translate this rotation into reciprocation. The longitudinal slot 31 in the central column prevents the roller mount assemblies from rotating. The described action lowers the tool plates 14 and 16 to pick up the article part from the feed means. The continuing rotation of the drive shaft and the cams mounted thereto subsequently cause the tool plates to rise, so that the feed means can retract. The tool plates are then lowered, placing the article part on to the turret nest which is in position therebelow. The tool plates are then returned to their original position and the cycle is complete. At this point the flip-flop switch deenergizes the tool plate drive motor and energizes the turret drive motor to start anew.

It should be appreciated that while this pick-up and place operation is being performed at one work station, other operations can be performed at other work stations on the machine. Of course, additional tool plates can be included to perform additional operations.

This invention is intended to be used with an assembly machine which includes tooling mounted to or actuated by common means for more than one work station. Although the rotary turret machine is perhaps the most common such machine and has been used in the above examples, it should be understood that the invention is not limited to such a system. The invention may also be used, for example, with an in-line assembly machine. Machines of this type typically include a chain or belt drive and provide the capability for sequential operations which are relatively long in duration and which extend over several operating positions. The chain or belt feed may be either continuous or intermittent. Conventionally, the ends of these machines are not utilized. However, the independent drive concept of this invention could enable provisions of one or more reciprocating tool plates supporting a plurality of tools at the ends of the machine, thereby performing any number of operations where none had been performed in the past.

Of course, it should be understood that various changes and modifications in the preferred embodiments described herein will be apparent to those skilled in the art. Such changes and modifications can be made without departing from the spirit and scope of the present invention and without diminishing its attendant advantages. It is therefore intended that such changes and modifications be covered by the following claims.

We claim:

1. An assembly machine comprising:
   a turret having a surface disposed in a plane, said turret being rotatable about an axis;
   means for indexing said turret about said axis;
   means for intermittently energizing said turret indexing means;
   a movable shaft coaxial with said axis;
   a first plate mounted to said shaft and adapted to move with said shaft, said first plate disposed in a plane generally parallel to the plane of said turret and being movable relative to said turret; and
   means which are mechanically independent of said indexing means and said intermittent energizing means, for driving said shaft in synchronism with the indexing of said turret thereby moving said first plate relative to said turret.

2. The assembly machine of claim 1 wherein said shaft is rotatable and includes cam means which reciprocate said first plate with respect to said turret.

3. The assembly machine of claim 2 further comprising a second plate mounted to said shaft disposed in a plane generally parallel to the plane of said turret, and wherein cam means reciprocates said second plate with respect to said turret and with respect to said first plate.

4. The assembly machine of claim 1 wherein said drive means acts on said shaft proximate its end which is remote from said turret.

5. The assembly machine of claim 1 wherein said means for synchronizing the movement of said shaft with the indexing of said turret comprise electrical switching means.

6. An assembly machine comprising:
   a turret having a surface disposed in a plane, said turret being rotatable about an axis;
   means for indexing said turret about said axis;
   a movable, rotatable shaft coaxial with said axis;
   first cam means coupled to said shaft;
   a first plate connected to said first cam means, said first plate disposed in a plane parallel to the plane of said turret and being movable relative to said turret;
   second cam means coupled to said shaft;
   a second plate connected to said second cam means, said second plate being movable with respect to said turret;

and
means for intermittently driving said shaft in synchronism with the indexing of said turret, thereby driving said first cam means to reciprocate said first plate with respect to said turret and driving said second cam means to reciprocate said second plate with respect to said turret and to said first plate.

7. The assembly machine of claim 6 wherein said turret is adapted to support articles to have operations performed thereon, one of said plates being adapted to support tooling which acts on the articles, and the other of said plates being adapted to actuate the tooling.

8. An assembly machine comprising:
a turret having a surface disposed in a plane, said turret being rotatable about an axis;
means for indexing said turret about said axis;
a movable shaft coaxial with said axis;
a first plate mounted to be moved by said shaft, said first plate disposed in a plane parallel to the plane of said turret and being movable relative to said turret;
and
means for intermittently driving said shaft in synchronism with the indexing of said turret, thereby intermittently moving said first plate relative to said turret, said turret indexing means and said means for driving said shaft being mechanically independent of one another so that the movement of said shaft can be stopped while said turret is being indexed.

9. The assembly machine of claim 8 wherein said shaft is rotatable and includes cam means which reciprocate said first plate with respect to said turret as said shaft is rotated, and wherein said means for rotating said shaft are mounted adjacent the end of said shaft which is remote from said turret.

10. An assembly machine comprising:
a turret having a surface disposed in a plane, said turret being rotatable about an axis;
means for indexing said turret about said axis;
a movable shaft coaxial with said axis;
means for simultaneously actuating a plurality of tooling, said means being operatively connected to said shaft; and
means for intermittently driving said shaft in synchronism with the indexing of said turret, thereby intermittently actuating said tooling, said turret indexing means and said means for driving said shaft being mechanically uncoupled to one another.

11. An assembly machine for performing operations on piece parts comprising:
a turret having a surface disposed in a plane, said turret being rotatable about an axis;
means for indexing said turret about said axis;
a movable shaft coaxial with said axis;
means for simultaneously moving a plurality of tooling to perform operations on the parts, said means being operatively connected to said shaft; and
means for intermittently driving said shaft in synchronism with the indexing of said turret, thereby intermittently performing operations on piece parts, said turret indexing means and said means for driving said shaft being mechanically uncoupled to one another.

12. An assembly machine comprising:
a turret having a surface disposed in a plane, said turret being rotatable about an axis;
means for indexing said turret about said axis, said indexing means including a turret drive motor, a drive shaft on said motor, and coupling means between said drive shaft and said turret;
a movable shaft coaxial with said axis;
means for driving said shaft;
means for simultaneously actuating a plurality of tooling, said means being operatively connected to said shaft; and
means for intermittently energizing said turret drive motor in synchronism with the means for driving said shaft, thereby intermittently indexing said turret, said means for driving said shaft and said means for intermittently energizing said turret drive motor being mechanically uncoupled to one another.

13. An assembly machine for performing operations on piece parts comprising:
a turret having a surface disposed in a plane, said turret being rotatable about an axis;
means for indexing said turret about said axis, said indexing means including a turret drive shaft on said motor, and coupling means between said drive shaft and said turret;
a movable shaft coaxial with said axis;
means for driving said shaft;
means for simultaneously moving a plurality of tooling to perform operations on the parts, said means being operatively connected to said shaft; and
means for intermittently energizing said turret drive motor in synchronism with the means for driving said shaft, thereby intermittently indexing said turret, said means for driving said shaft and said means for intermittently energizing said turret drive motor being mechanically uncoupled to one another.

14. A rotary assembly machine for performing operations on piece parts comprising:
a turret having a surface disposed in a plane, said turret being rotatable about an axis;
means for indexing said turret about said axis;
a movable shaft coaxial with said axis;
means for driving said shaft;
means for simultaneously moving a plurality of tooling to perform operations on parts, said means being operatively connected to said shaft;
a source of power for said turret indexing means and for said shaft drive means;
a first drive train transmitting power from said power source to said turret indexing means; and
a second drive train for transmitting power from said power source to said shaft drive means, said second drive train being mechanically independent of said first drive train.

15. The rotary assembly machine of claim 14 wherein said first drive train includes means for interrupting the transmission of power from said power source to said turret indexing means independent of the operation of said second drive train.

16. The rotary assembly machine of claim 14 wherein said second drive train includes means for interrupting the transmission of power from said power source to said shaft drive means independent of the operation of said first drive train.

17. The rotary assembly machine of claim 20 wherein power transmission from said first drive train and said second drive train are mutually exclusive.

18. A rotary assembly machine for performing operations on piece parts comprising:
- a turret having a surface disposed in a plane, said turret being rotatable about an axis;
- means for indexing said turret about said axis;
- a movable shaft coaxial with said axis;
- means for driving said shaft;
- means for simultaneously moving a plurality of tooling to perform operations on parts, said means being operatively connected to said shaft;
- a first source of power for said turret indexing means; and
- a second source of power for said drive shaft means, said second power source being mechanically independent of said first power source.

19. The rotary assembly machine of claim 18 wherein said shaft and said turret indexing means are not adapted to be energized for movement simultaneously.

20. The rotary assembly machine of claim 18 wherein said first power source and said second power source are not adapted to be energized simultaneously.

* * * * *

// UNITED STATES PATENT AND TRADEMARK OFFICE
CERTIFICATE OF CORRECTION

PATENT NO. : 4,313,260
DATED : February 2, 1982
INVENTOR(S) : Yeo, Norman H. and Swanson, Douglas L.

It is certified that error appears in the above—identified patent and that said Letters Patent is hereby corrected as shown below:

In Claim 17, column 8, line 66, delete "20" and insert therefor --14--.

Signed and Sealed this

Tenth Day of August 1982

[SEAL]

Attest:

GERALD J. MOSSINGHOFF

Attesting Officer   Commissioner of Patents and Trademarks